US008896414B2

(12) United States Patent
Vinkenvleugel et al.

(10) Patent No.: US 8,896,414 B2
(45) Date of Patent: Nov. 25, 2014

(54) UPDATING SCENES IN REMOTE CONTROLLERS OF A HOME CONTROL SYSTEM

(75) Inventors: Lucius Theodorus Vinkenvleugel, Veldhoven (NL); James Joseph Anthony McCormack, Eindhoven (NL); Ay Ling De Goederen-Oei, Best (NL); Nathalie Dorothee Pieternel Leurs, Eindhoven (NL); Diane Lutters, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 699 days.

(21) Appl. No.: 13/058,028

(22) PCT Filed: Aug. 11, 2009

(86) PCT No.: PCT/IB2009/053525
§ 371 (c)(1),
(2), (4) Date: Feb. 8, 2011

(87) PCT Pub. No.: WO2010/018539
PCT Pub. Date: Feb. 18, 2010

(65) Prior Publication Data
US 2011/0140832 A1    Jun. 16, 2011

(30) Foreign Application Priority Data

Aug. 13, 2008    (EP) .................................... 08105031

(51) Int. Cl.
*H04L 7/00*       (2006.01)
*G05B 19/02*     (2006.01)
*H04B 1/20*       (2006.01)
*G08B 5/22*       (2006.01)
*H05B 37/02*     (2006.01)

(52) U.S. Cl.
CPC ........... *H05B 37/0272* (2013.01); *Y02B 20/445* (2013.01)

USPC ........... 340/4.2; 340/4.11; 340/4.3; 340/4.42; 340/4.51; 340/4.62

(58) Field of Classification Search
CPC ............................. H05B 37/0272; H05B 33/08
USPC ............... 340/4.11, 4.2, 4.3, 4.31, 4.32, 4.33, 340/4.34, 4.41, 4.42, 4.51, 4.61, 4.62
See application file for complete search history.

(56) References Cited

U.S. PATENT DOCUMENTS

| 5,459,376 A | 10/1995 | Buij et al. |
| 6,160,359 A * | 12/2000 | Fleischmann ................. 315/294 |

(Continued)

FOREIGN PATENT DOCUMENTS

| CN | 1463082 A | 12/2003 |
| EP | 1507361 A2 | 2/2005 |

(Continued)

*Primary Examiner* — Daniel Wu
*Assistant Examiner* — Mancil Littlejohn

(57) ABSTRACT

The invention relates to synchronizing settings in a home control system such as settings for lighting scenes in a lighting system with a plurality of light units. A basic idea of the invention is to synchronize settings such as lighting scene settings in a home control system with a network of devices such as light units and multiple control devices for controlling the network devices. An embodiment of the invention provides a device (Sync) for synchronizing settings in a home control system comprising a memory (12) for storing settings of one or more of devices (L1-L9) of the home control system, a communication unit (14) for receiving signals (16) from and transmitting signals (18) to control devices (RC3-RC 4) of the home control system, and a processor (10) for synchronizing stored settings in the home control system upon receipt of a signal (16) from a control device (RC3, RC4) of the home control system by transmitting a synchronization signal (18). Thus, all control devices may have access to all settings. Particularly, a user may control all settings with one control devices and does not have to remember which settings are stored in which control device.

6 Claims, 4 Drawing Sheets

(56) References Cited

U.S. PATENT DOCUMENTS

| | | |
|---|---|---|
| 6,174,073 B1 | 1/2001 | Regan et al. |
| 6,466,234 B1 * | 10/2002 | Pyle et al. ............... 715/771 |
| 6,823,223 B2 * | 11/2004 | Gonzales et al. ............ 700/86 |
| 7,064,675 B2 * | 6/2006 | Zigmond et al. ......... 340/12.53 |
| 2005/0125081 A1 | 6/2005 | Ota |
| 2005/0231134 A1 | 10/2005 | Sid |
| 2008/0054821 A1 * | 3/2008 | Busby ..................... 315/291 |

FOREIGN PATENT DOCUMENTS

| | | |
|---|---|---|
| GB | 2390204 A | 12/2003 |
| JP | 2003243189 A | 8/2003 |
| WO | 2007023414 A2 | 3/2007 |
| WO | 2007132382 A2 | 11/2007 |
| WO | 2008032237 A1 | 3/2008 |

* cited by examiner

UPDATING SCENES IN REMOTE CONTROLLERS OF A HOME CONTROL SYSTEM

FIELD OF THE INVENTION

The invention relates to synchronizing settings in a home control system such as settings for lighting scenes in a lighting system with a plurality of light units.

BACKGROUND OF THE INVENTION

An example of a home control system is a lighting control system. Future lighting applications anticipate a lighting (home) control system with dimmable lights and wireless control devices like (wall) switches and remote controls. In most cases people will start with a simple system with a few lamps and one remote control. Gradually the system can be extended with more lamps and more (remote) control devices. Such lighting systems often allow a user to create a lighting scene with a remote control device and to store these scenes in the remote control device. A lighting scene comprises settings of the lamps of the lighting system, which are activated to create the lighting scene. Typically, these settings comprise dimming values of lamps, the color of the created lighting. A lighting scene stored in a remote control can later be retrieved by the user.

However, with more and more lamps and control devices to create, adjust and store lighting scenes this can lead to a situation where different controls devices store different lighting scenes. This can lead to a situation where it is difficult for a user to remember which control device contains which lighting scenes and/or which control device controls which lamps.

SUMMARY OF THE INVENTION

It is an object of the present invention to provide a system and a method which allow a user to use any control device of a home control system for retrieving and setting up stored settings of the home control system.

The object is solved by the subject matter of the independent claims. Further embodiments are shown by the dependent claims.

A basic idea of the invention is to synchronize settings such as lighting scene settings in a home control system with a network of devices such as light units and multiple control devices for controlling the network devices. By synchronizing the settings, all control devices may have access to all settings of the home control system and may control all settings with any of the control devices and the user does not have to remember which settings are stored in which control device. Control device in the context of the present invention means any kind of device, which is provided for controlling settings of devices of a home control network, such as a wireless remote control, which is able to communicate with the home control system, particularly with devices of the home control system, via a wireless connection. A home control system in the context of the present invention comprises any system, which is installed in a home and comprises several devices, which may be controlled via one or more control devices, such as a lighting, heating and/or air-conditioning system.

An embodiment of the invention provides a device for synchronizing settings in a home control system comprising
a memory for storing settings of one or more of devices of the home control system,
a communication unit for receiving signals from and transmitting signals to control devices of the home control system, and
a processor for synchronizing stored settings in the home control system upon receipt of a signal from a control device of the home control system by transmitting a synchronization signal. This device makes it possible to introduce a synchronization function for settings of devices of a home control system, for example a home lighting system. The device may be implemented as a separate device for extension of an existing home control system, but may also integrated in devices of a home control system as well as control devices.

According to a further embodiment of the invention, the processor may be configured
to load and process a stored setting according to a command received with a signal from a control device by means of the communication unit, and
to control the communication unit to transmit a synchronization signal to devices for setting-up the devices in accordance with the processed setting. With this embodiment, the synchronization devices serves as a central storage for all settings of the home control system. The synchronization signals may in this embodiment store all settings for the devices of the home control system, in order for example to render a desired lighting scene with a home lighting system in accordance with the settings. The settings may be available for access by the control devices so that a user may easily and comfortably select a desired setting with a control device.

According to a yet further embodiment of the invention, the processor may be configured
to store a changed setting according to a command received with a signal from a control device by means of the communication unit, and
to control the communication unit to transmit a synchronization signal to other active control devices for indicating the changed setting and/or to react to update requests from other control devices and to (re)transmit a synchronisation signal to those devices. According to this embodiment, the synchronization devices serves as a kind of temporary storage for changed settings and may inform other control devices, when these become active, about the changed settings with the synchronization signals. The settings may be stored in all control devices, and when a user changes with one control device a certain setting, this embodiment enables an automatic updating of the settings stored in all other control devices of the home control system. Furthermore, all other control devices can request an update when they wake-up or rejoin the system. This update request triggers a (re)transmission of a synchronisation signal to the device, which sent the update request.

According to a further embodiment of the invention, the processor may be also configured
to store a command to change a setting received with a signal from a control device by means of the communication unit and
to control the communication unit to transmit a synchronization signal comprising the stored command to change a setting to other active control devices. This embodiment is particularly suitable for home control systems, in which settings are stored in the devices, for example in lamps of a home lighting system. However, in order to allow a user to select from the stored settings, also the control devices store at least a list of the available settings. Thus, when a setting is changed by a user, also this change should be synchronized with the other control devices. This may be accomplished according to this embodiment in that a command to change the setting, which is transmitted from the control device to the respective devices, is received by the synchronization device and temporarily stored. The synchronization device then may transmit a synchronization signal comprising the stored command to other active control devices so that these control devices may update their internally stored settings.

The invention relates according to a further embodiment to a home control system comprising several devices, several control device being adapted to remotely control the devices, and a device of any of the preceding claims for synchronizing settings in the home control system. A home control system may be for example a home lighting system with several lamps and remote control devices for changing settings of the lamps such as dimming lamps.

Furthermore, an embodiment of the invention provides a method for synchronizing settings in a home control system comprising the acts of storing settings of one or more of devices of the home control system, receiving signals from and transmitting signals to control devices of the home control system, and synchronizing stored settings in the home control system upon receipt of a signal from a control device of the home control system by transmitting a synchronization signal. This method may be for example implemented by an algorithm for a synchronization function of a home control system.

According to a further embodiment of the invention, the act of receiving signals may comprise receiving a signal comprising a command to load and process a stored setting from a control device, and the act of synchronizing stored settings may comprise transmitting a synchronization signal to devices for setting-up the devices in accordance with the processed setting.

According to a further embodiment of the invention, the act of receiving signals may comprise receiving a signal comprising a command to store a changed setting from a control device, and the act of synchronizing stored settings may comprise transmitting a synchronization signal to other active control devices for indicating the changed setting.

According to a further embodiment of the invention, the act of receiving signals may comprise receiving a signal comprising a command to store a command to change a setting from a control device, and the act of synchronizing stored settings may comprise transmitting a synchronization signal comprising the stored command to change a setting to other active control devices.

According to a further embodiment of the invention, a computer program may be provided, which enables a processor to carry out the above method according to the invention.

According to a further embodiment of the invention, a record carrier storing a computer program according to the invention may be provided, for example a CD-ROM, a DVD, a memory card, a diskette, internet memory device or a similar data carrier suitable to store the computer program for optical or electronic access.

A further embodiment of the invention provides a computer programmed to perform a method according to the invention such as a PC (Personal Computer), which may comprise an interface for communication with devices and control devices of a home control system.

These and other aspects of the invention will be apparent from and elucidated with reference to the embodiments described hereinafter.

The invention will be described in more detail hereinafter with reference to exemplary embodiments. However, the invention is not limited to these exemplary embodiments.

DETAILED DESCRIPTION OF EMBODIMENTS

Figure 1:
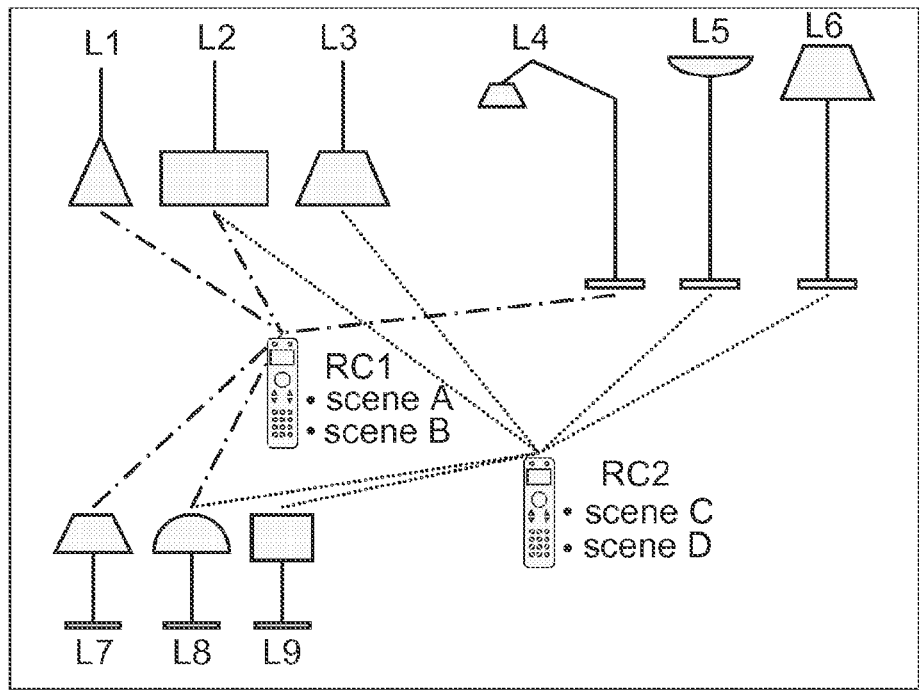
FIG. 1 shows a home lighting system with several lamps and remote control devices for setting-up the lamps in order to create user desired lighting scenes, wherein settings for different lighting scenes are stored in different remote control devices.

In the following, functionally similar or identical elements may have the same reference numerals.

FIG. 1 shows a home lighting system with several lamps L1-L9, which may be remotely controlled with remote control devices RC1 and RC2. The remote control devices RC1 and RC2 communicate by means of a wireless communication connection with the lamps L1-L9, such as a radio frequency (RF) connection. Both remote control devices RC1 and RC2 can create, adjust and store "scenes", i.e. lighting scenes. Remote control device RC1 controls lamps L1, L2, L4, L7 and L8, and remote control device RC2 controls lamps L2, L3, L5, L6, L8 and L9. If the lamps are dimmable it is also possible that each remote control device RC1 and RC2 has different dim settings for the lamps. In these cases remote control device RC1 has different "scene" settings (scenes A and B) compared to remote control device RC2 (scenes C and D). For example scene A can be defined as: L1 on 50%, L2 on 80%, L4 on 30%, L7 on 100%, L8 on 20% dim level; scene C can be defined as: L2 on 90%, L3 on 40%, L5 on 60%, L6 on 70%, L8 on 75% and L9 on 25% dim level.

For such a home lighting system the following problems can occur: with more and more lamps and remote controls this can lead to a situation where it is difficult to remember which remote control device stores which "scenes" and/or which remote control device controls which lamps. In case the user has a room with different scenes and multiple remote controls, but the user wants to have the same settings in all the remote controls, or that all the remote controls activate the same settings or "scenes".

Figure 2:
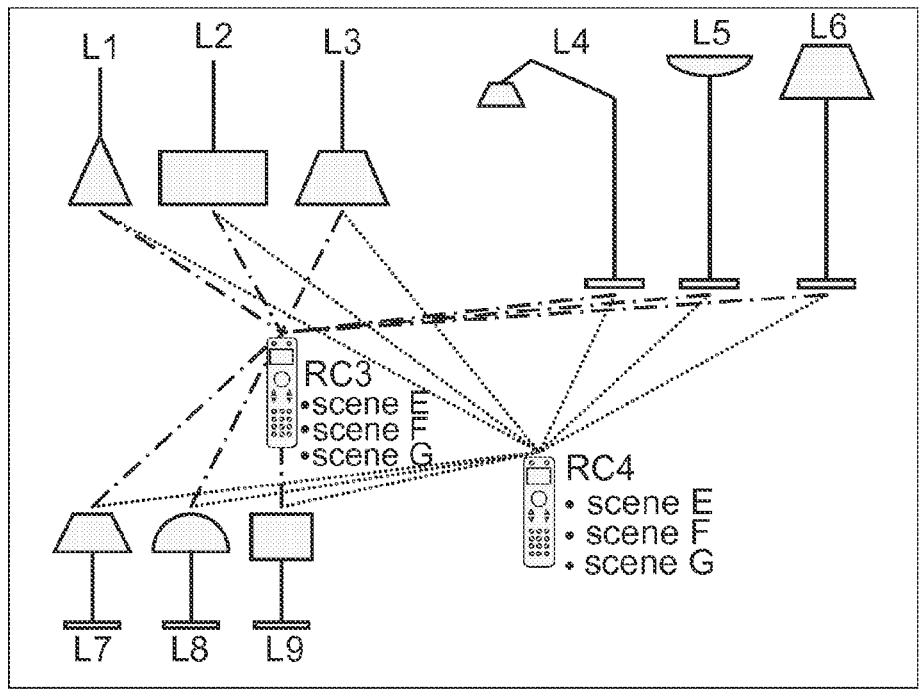
FIG. 2 shows the home lighting system of FIG. 1, wherein the remote control devices are synchronized and comprise the settings for the same lighting scenes.

FIG. 2 shows the home lighting system of FIG. 1, wherein both remote control devices RC3 and RC4 contain the settings of scene E, F and G, and both remote control devices RC3 and RC4 control the same lamps (L1, L2, ... L9). In this case it is necessary for the remote controls to synchronize their settings. For example if a user changes a scene setting in remote control device RC3, and/or adds a lamp to a scene in remote control device RC3, and/or creates a new scene in remote control device RC3, then these settings also need to be communicated to, or exchanged with remote control device RC4, even in case the settings are stored in the lamps.

Figure 3:
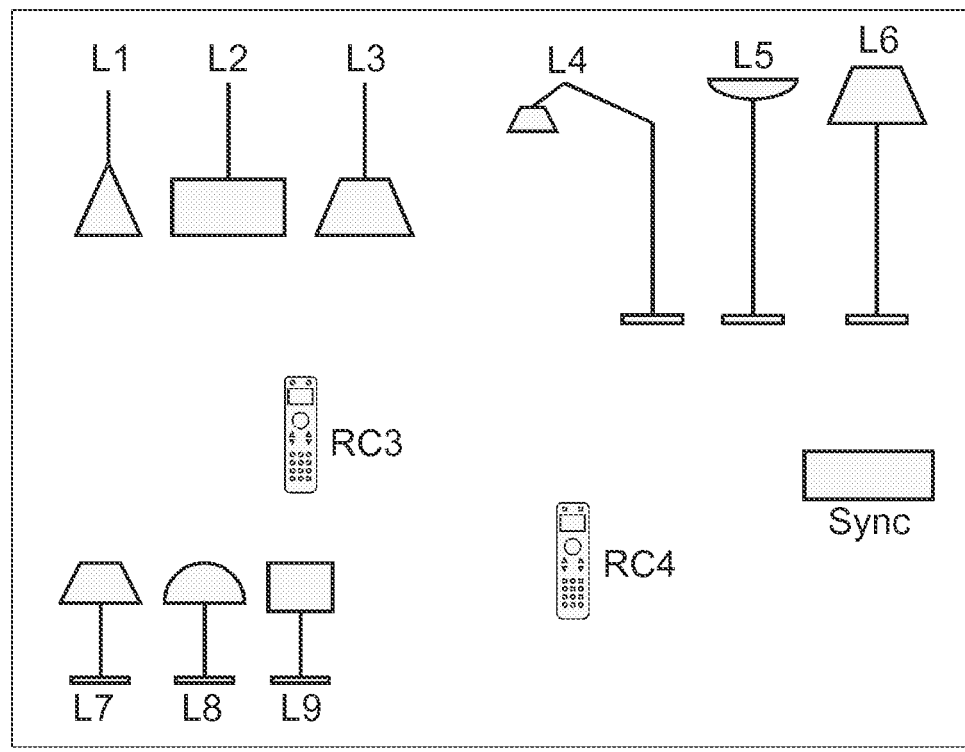
FIG. 3 shows the home lighting system of FIG. 1 with a device for synchronizing settings in the home lighting system according to the invention.

FIG. 3 shows the home lighting system of FIG. 1 with a new device named "Sync" (in the following briefly referenced as Sync device) for synchronizing settings according to the invention. The function of the Sync device is to realize the synchronize function of settings in the network of the home lighting system. The Sync device is a separate device of the home lighting system and may be for example located centrally in a room, wall-mounted, integrated in a lamp or even in a remote control device. For an extension of the home lighting system with synchronization functionality, the Sync device may be offered as a separate device, which may be easily integrated in an existing home control system or home lighting system by plug-and-play.

Figure 4:
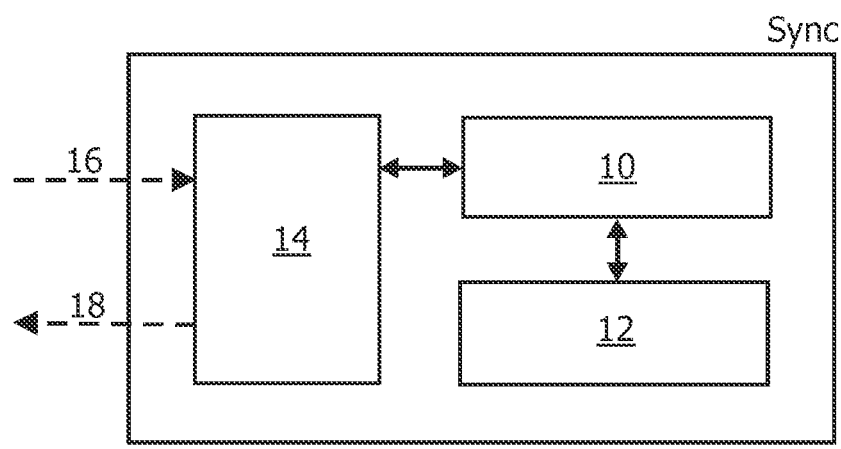
FIG. 4 shows an embodiment of a device for synchronizing settings in a home lighting system according to the invention.

FIG. 4 shows the Sync device in detail: it comprises a RF communication unit 14 for receiving RF signals 16 and transmitting RF signals 18, a processor 10 controlling the RF communication unit 14 and executing a software for synchronizing the settings such as lighting scenes in the home lighting system, and a memory 12 for storing settings in the Sync device. The Sync device is adapted to communicate with remote control devices of the home lighting system. It may also be adapted to directly communicate with lamps of the home lighting system, as will be described later in detail. The communication with a device of the home lighting system such as a remote control device may be established by means of a pairing process of the Sync device with the device. It is also possible to integrate the Sync device in the wireless communication in the home lighting system by for example storing a key similar to a Wireless Local Area Network (WLAN) in order to allow the Sync device to communicate with each device of the home lighting system, which is able to communicate with other devices in the network.

Figure 5:
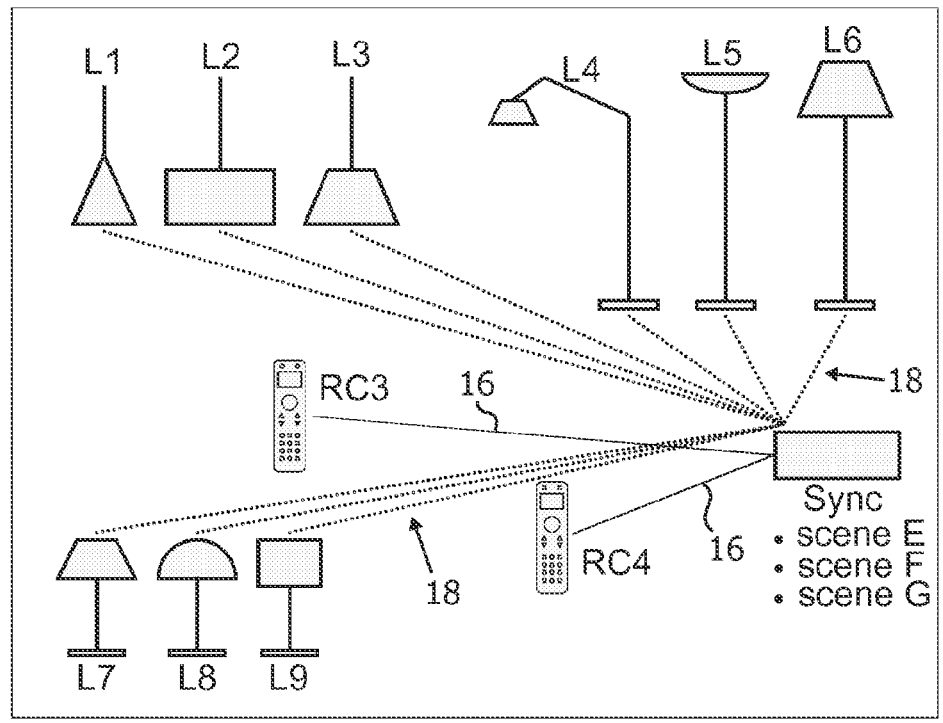
FIG. 5 shows a first embodiment of a method for synchronizing settings in the home lighting system according to the invention.

FIG. 5 shows an embodiment of the invention, in which the Sync device stores the settings of lighting scenes of the home lighting system so that there is one central place where these settings are stored and may be retrieved. In this way all remote control devices RC3 and RC4 activate the same settings and "scenes", preventing the problems described earlier. In the situation shown in FIG. 5, the Sync device stores the settings of scenes E, F and G. As soon as one of the remote control devices RC3 or RC4 becomes active and sends a command to make a "scene" or lighting scene, the command is passed over to the Sync device from the remote control device RC3 or RC4 via a signal 16. Next, the Sync device will send the command or distribute the settings to the lamps L1, ..., L9, which are involved in rendering the commanded lighting scene, via a signal 18. Both signals 16 and 18 are transmitted wirelessly via RF connections. In the situation shown in FIG. 5, the Sync device acts as a central synchronization element switched between the remote control devices RC3 and RC4 and the lamps L1-L9. Thus, a remote control device RC3 or RC4 does not directly control a lamp L1-L9, but via the Sync device. Also, if a user creates or adjusts a new or existing lighting scene via the remote control device RC3 or RC4, the remote control device RC3 or RC4 sends the creation and adjusting commands via signal 16 to the Sync device, which stores the settings and forwards them via signal 18 to the respective lamps L1-L9 of the home lighting system so that the user gets a feedback to the commands entered in the remote control device RC3 or RC4. In this way Sync can update all control devices that a new scene is created and added to the list of available scenes or equally control devices can obtain the latest update information from when they wake-up, join or re-join the system.

A program executed by the processors 10 of the Sync device for performing the synchronization of settings as illustrated in FIG. 5 is briefly explained in the following. Settings of the lamps L1-L9 for creating lighting scenes are stored in the Sync device. This may be accomplished by transmitting settings from a remote control device RC3 or RC4, which were entered by a user, to the Sync device via signals which comprises the settings and a command for storing the settings in the Sync device. Then, the Sync device receives signal 16 from the remote control device RC3 or RC4, which was for example activated by a user, for loading a stored setting and for processing the load setting. This can be performed for example when after user activation of a remote control device the user scrolls through a list of available settings of lighting scenes displayed on the remote control device RC3 or RC4, selects a desired lighting scene by selecting the corresponding setting and presses a transmit button to transmit the selection to the Sync device. The Sync device, which receives this selection, loads the stored setting and processes it by creating a signal for setting-up the lamps L1-L9 such that the desired lighting scene may be rendered in the home lighting system. Thereafter, the Sync device transmits the created signal to the lamps L1-L9.

Figure 6:
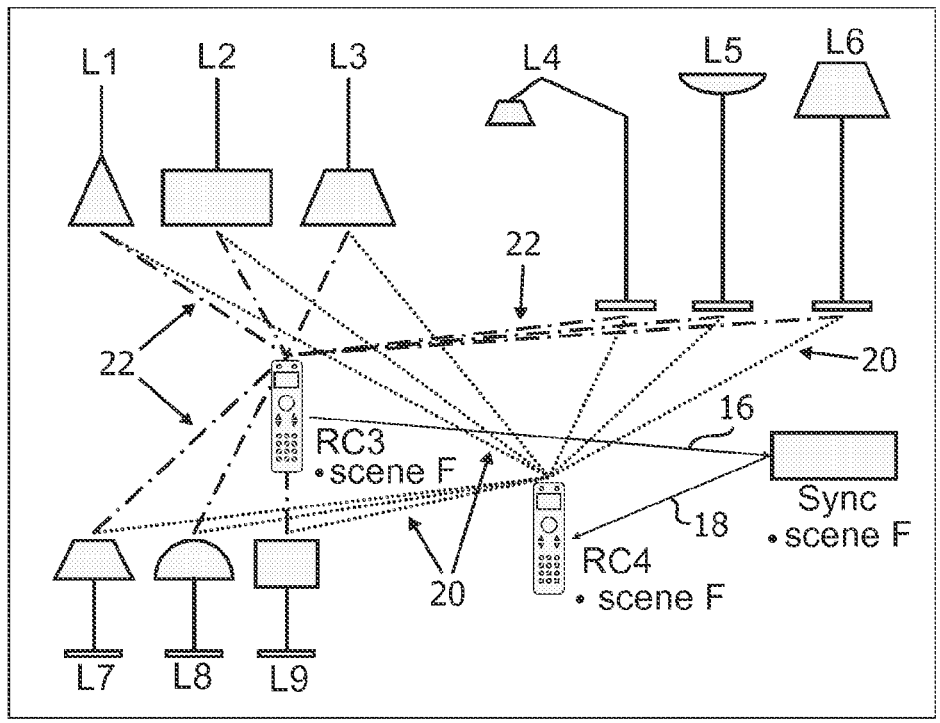
FIG. 6 shows a second embodiment of a method for synchronizing settings in the home lighting system according to the invention.

FIG. 6 shows a further embodiment of the invention, in which the Sync device temporarily stores changes of settings of the home lighting system, such that changes may be exchanged to other remote control devices when they become active. In this case, the settings of lighting scenes E, F and G are stored in or activated by the remote control devices RC3 and RC4. When a change in the settings for lighting scene F was made for example in remote control device RC3, the device RC3 creates and sends a command via a signal 16 to the Sync device to temporarily store the changed settings of scene F. As soon as the remote control device RC4 becomes active, it will receive a synchronization signal 18 from the Sync device, which indicates that there is a change in the settings of scene F and passes over the temporarily stored changed settings of scene F to the remote control device RC4, which stores the received changed settings of scene F in an internal memory. The settings of scene F may then be transmitted from the remote control devices RC3 and RC4 via RF signals 22 and 20, respectively, to the lamps L1-L9 in order to render a desired lighting scene.

A program executed by the processors 10 of the Sync device for performing the synchronization of settings as illustrated in FIG. 6 is briefly explained in the following. The Sync device receives a signal, which comprises a command to store changed settings and the changes of the settings. This causes the processor 10 of the Sync device to store the received changed settings in the memory 12 of the Sync device in accordance with the received command. Then, the Sync device transmits a synchronization signal, which indicates the changed settings by for example containing a descriptor "scene F settings changed", Each active remote control device such as RC4, which receives this synchronization signal may check whether it has settings for scene F stored and may change the stored settings in accordance with the changes contained in the synchronization signal. The synchronization signal may be transmitted continuously by the Sync device, or it may be only transmitted if a remote control device becomes active, which may be noted by the Sync device via for example a remote control device activation signal, which may be automatically sent out by each remote control device upon activation and allows the Sync device to quickly determine which control devices are active and switched on.

Figure 7:
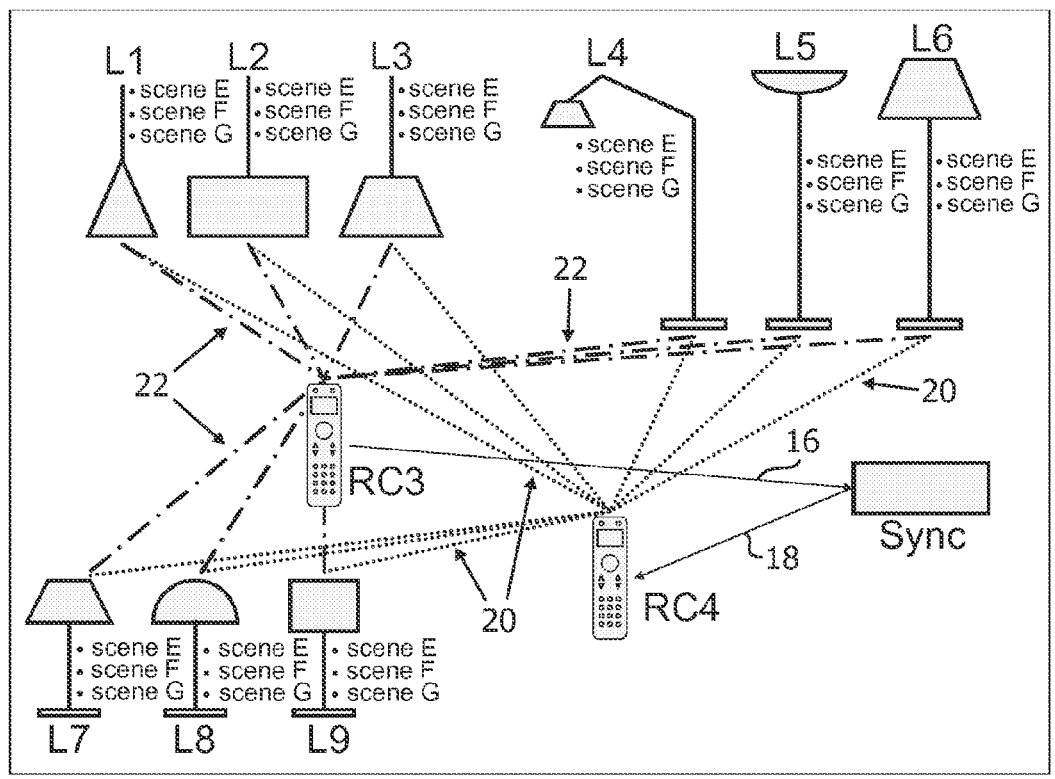
FIG. 7 shows a third embodiment of a method for synchronizing settings in the home lighting system according to the invention.

The home lighting system also can be configured such that settings of scenes E, F and G are stored in the lamps L1-L9, as shown in FIG. 7. The remote control devices RC3 and RC4 will then send a command to activate a scene to the lamps L1-L9 via RF signals 20 and 22, respectively. In this case, a change in dim settings of a scene will result in "build-in" synchronization because the settings are stored only in one location: the lamps L1-L9. However, the remote control devices RC3 and RC4 still need to know how many scenes are created and possible to activate. For example if a new scene is created with remote control device RC3, also remote control device RC4 needs to be informed about this change and to update the list of available scenes. So also in this case a synchronization function "Sync" is needed. FIG. 7 shows a further embodiment of the invention, which implements a synchronization for a change of a scene. If a user changes for example scene E with the remote control device RC3, the change is signalled via a RF signal 16 to the Sync device. The signal 16 comprises a command to change the setting E. The Sync device temporarily stores the received command to change the setting E, and forwards the command to change setting E if the remote control device RC4 is activated by the user. Then, the remote control device RC4 also knows the changed setting E and may allow a user to select this changed setting.

The Sync device can also be located in a lamp or a plug-in unit. In principle, any control device of a home control system that is constantly powered can take over the role of the Sync device.

The present invention gives the opportunity to offer a synchronization function for settings in a home control system as a separate product to consumers. In this case consumers can decide if they would like to buy the function and its advantages or not.

The invention can be applied in any home control system, for example in lighting control systems in homes, shops and office applications.

At least some of the functionality of the invention may be performed by hard- or software. In case of an implementation in software, a single or multiple standard microprocessors or microcontrollers may be used to process a single or multiple algorithms implementing the invention.

It should be noted that the word "comprise" does not exclude other elements or steps, and that the word "a" or "an" does not exclude a plurality. Furthermore, any reference signs in the claims shall not be construed as limiting the scope of the invention

The invention claimed is:

1. A device for synchronizing settings in a home control system comprising:
    a memory for storing settings of one or more of devices of the home control system,
    a communication unit for receiving signals from and transmitting signals to control devices of the home control system, and
    a processor configured to store a changed setting according to a command received with a signal (16) from a control device by means of the communication unit, and to control the communication unit to transmit a synchronization signal to other active control devices for indicating the changed setting and/or to react to update requests from other control devices and to retransmit a synchronization signal to those devices.

2. The device of claim 1, wherein the processor is configured to store a command to change a setting received with a signal from a control device by means of the communication unit, and to control the communication unit to transmit a synchronization signal comprising the stored command to change a setting to other active control devices.

3. A method for synchronizing settings in a home control system comprising the acts of:
    storing settings of one or more of devices of the home control system,
    receiving signals from and transmitting signals to control devices of the home control system, and
    synchronizing stored settings in the home control system upon receipt of a signal from a control device of the home control system by transmitting a synchronization signal;
    wherein the act of receiving signals comprises receiving a signal comprising a command to store a changed setting from a control device, and the act of synchronizing stored settings comprises transmitting a synchronization signal to other active control devices for indicating the changed setting.

4. The method of claim 3, wherein the act of receiving signals comprises receiving a signal comprising a command to store a command to change a setting from a control device, and the act of synchronizing stored settings comprises transmitting a synchronization signal comprising the stored command to change a setting to other active control devices.

5. A non-transitory computer readable storage medium comprising a computer program including a set of instructions executable by a processor, the medium comprising:
    code for storing settings of one or more of devices of the home control system,
    code for receiving signals from and transmitting signals to control devices of the home control system, and
    code for synchronizing stored settings in the home control system upon receipt of a signal from a control device of the home control system by transmitting a synchronization signal;
    wherein the act of receiving signals comprises receiving a signal comprising a command to store a changed setting from a control device, and the act of synchronizing stored settings comprises transmitting a synchronization signal to other active control devices for indicating the changed setting.

6. A home control system comprising:
    a plurality of devices;
    a plurality of control devices each being adapted to remotely control the devices; and,
    the device of claim 1 for synchronizing settings in the home control system, such that any one of said plurality of control devices can directly control each of the plurality of devices in accordance with said synchronized settings.

* * * * *